(12) United States Patent
Sasaki

(10) Patent No.: US 8,964,099 B2
(45) Date of Patent: Feb. 24, 2015

(54) LENS DEVICE CAPABLE OF UTILIZING AN AF-FRAME AUTOMATIC TRACKING FUNCTION

(71) Applicant: FUJIFILM Corporation, Tokyo (JP)

(72) Inventor: Tadashi Sasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 13/957,728

(22) Filed: Aug. 2, 2013

(65) Prior Publication Data

US 2013/0314579 A1 Nov. 28, 2013

Related U.S. Application Data

(63) Continuation of application No. PCT/JP2012/052075, filed on Jan. 31, 2012.

(30) Foreign Application Priority Data

Feb. 7, 2011 (JP) .................................. 2011-023932

(51) Int. Cl.
*H04N 5/232* (2006.01)
*G02B 7/28* (2006.01)
*G02B 7/36* (2006.01)
*G03B 13/36* (2006.01)
*H04N 5/225* (2006.01)

(52) U.S. Cl.
CPC .............. *H04N 5/23293* (2013.01); *G02B 7/28* (2013.01); *G02B 7/36* (2013.01); *G03B 13/36* (2013.01); *H04N 5/23212* (2013.01)
USPC ............ 348/346; 348/349; 348/361; 396/148

(58) Field of Classification Search
USPC ........................................ 348/346, 349, 361
See application file for complete search history.

(56) References Cited

U.S. PATENT DOCUMENTS

| 6,683,652 | B1 * | 1/2004 | Ohkawara et al. | 348/347 |
|---|---|---|---|---|
| 7,151,570 | B2 * | 12/2006 | Kaneda | 348/360 |
| 7,548,269 | B2 * | 6/2009 | Yata | 348/352 |
| 7,973,851 | B2 * | 7/2011 | Yajima | 348/346 |
| 2004/0036792 | A1 * | 2/2004 | Moriya et al. | 348/345 |
| 2005/0264679 | A1 * | 12/2005 | Sasaki et al. | 348/345 |

(Continued)

FOREIGN PATENT DOCUMENTS

| JP | 10-173980 | 6/1998 |
|---|---|---|
| JP | 2005-345605 | 12/2005 |

(Continued)

OTHER PUBLICATIONS

International Search Report, PCT/JP2012/052075, Apr. 17, 2012.

*Primary Examiner* — Ngoc-Yen Vu
(74) *Attorney, Agent, or Firm* — Young & Thompson

(57) ABSTRACT

A lens device according to one aspect of the presently disclosed subject matter obtains camera information indicating whether a mounted camera is a first camera with an AF-frame display function or a second camera without the AF-frame display function; when the camera information indicating the first camera is obtained, when the camera information indicating the second camera is obtained and an automatic tracking mode is set, the lens device changeably sets position and size of the AF frame; and when the camera information indicating the second camera is obtained and the automatic tracking mode is not set, the lens device fixes the AF frame at a predetermined position and size.

11 Claims, 9 Drawing Sheets

(56) References Cited

U.S. PATENT DOCUMENTS

| | | |
|---|---|---|
| 2005/0264680 A1 | 12/2005 | Yajima |
| 2006/0083506 A1 | 4/2006 | Kanayama |
| 2006/0109371 A1 | 5/2006 | Sasaki et al. |
| 2007/0217777 A1 | 9/2007 | Sasaki |
| 2010/0074606 A1* | 3/2010 | Sasaki .......................... 396/121 |
| 2010/0123782 A1 | 5/2010 | Yata |

FOREIGN PATENT DOCUMENTS

| | | |
|---|---|---|
| JP | 2006-113265 | 4/2006 |
| JP | 2006-195342 | 7/2006 |
| JP | 2007-248649 | 9/2007 |
| JP | 2010-049148 | 3/2010 |
| JP | 2010-124120 | 6/2010 |

* cited by examiner

FIG. 3
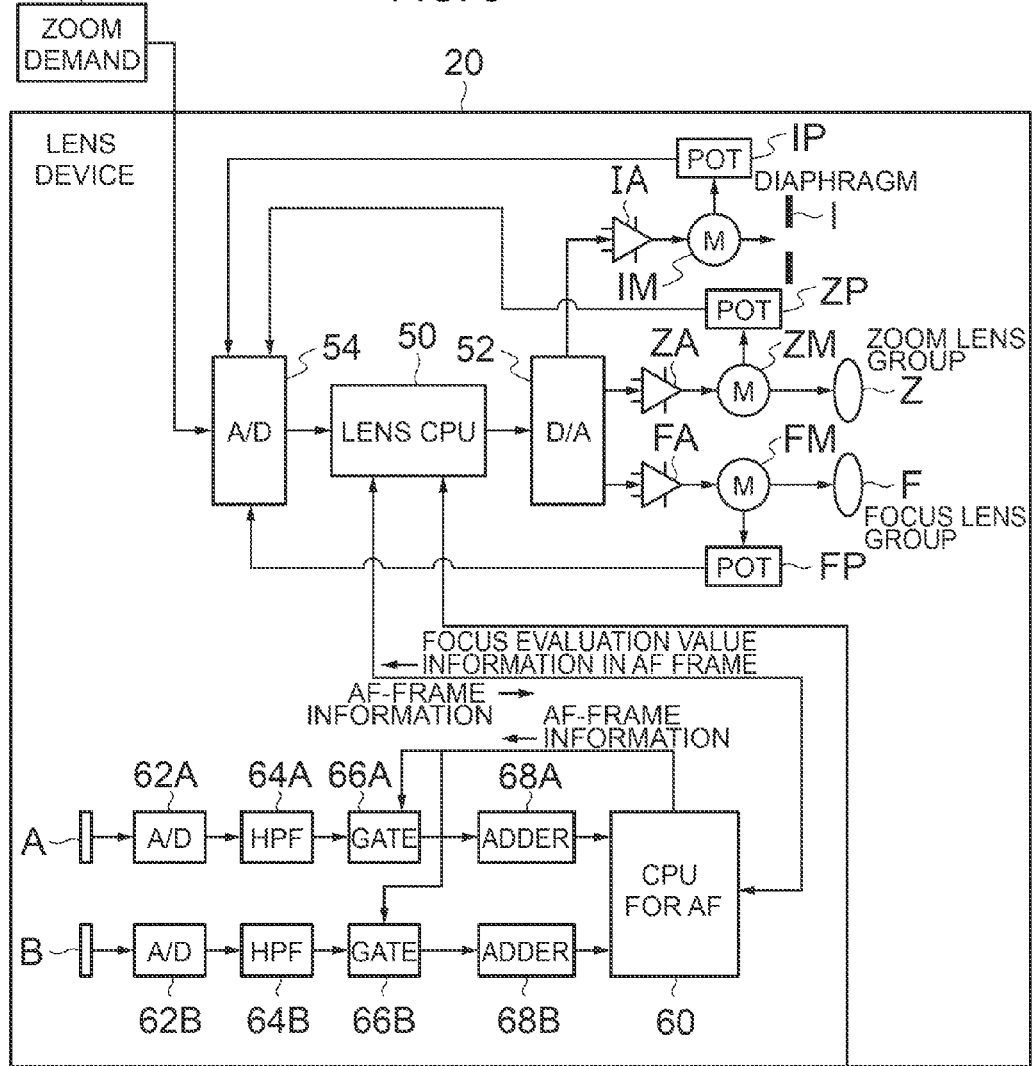
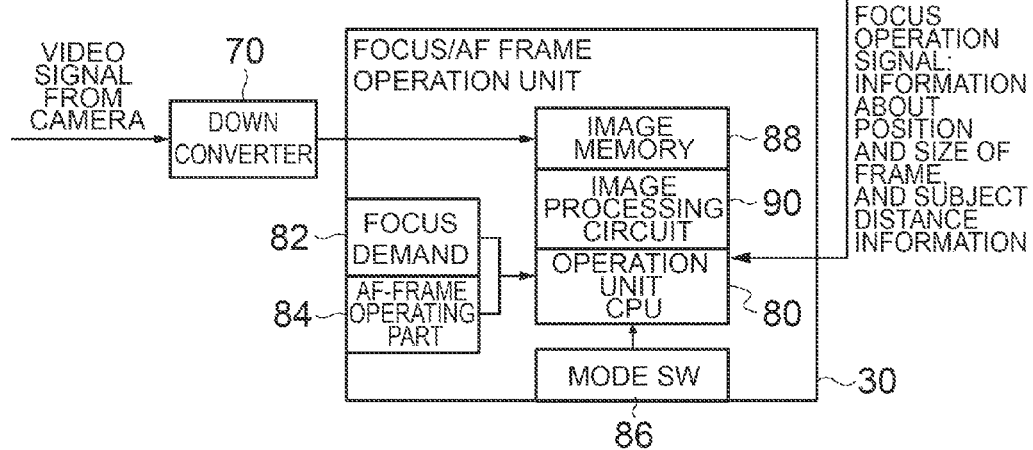

FIG. 11
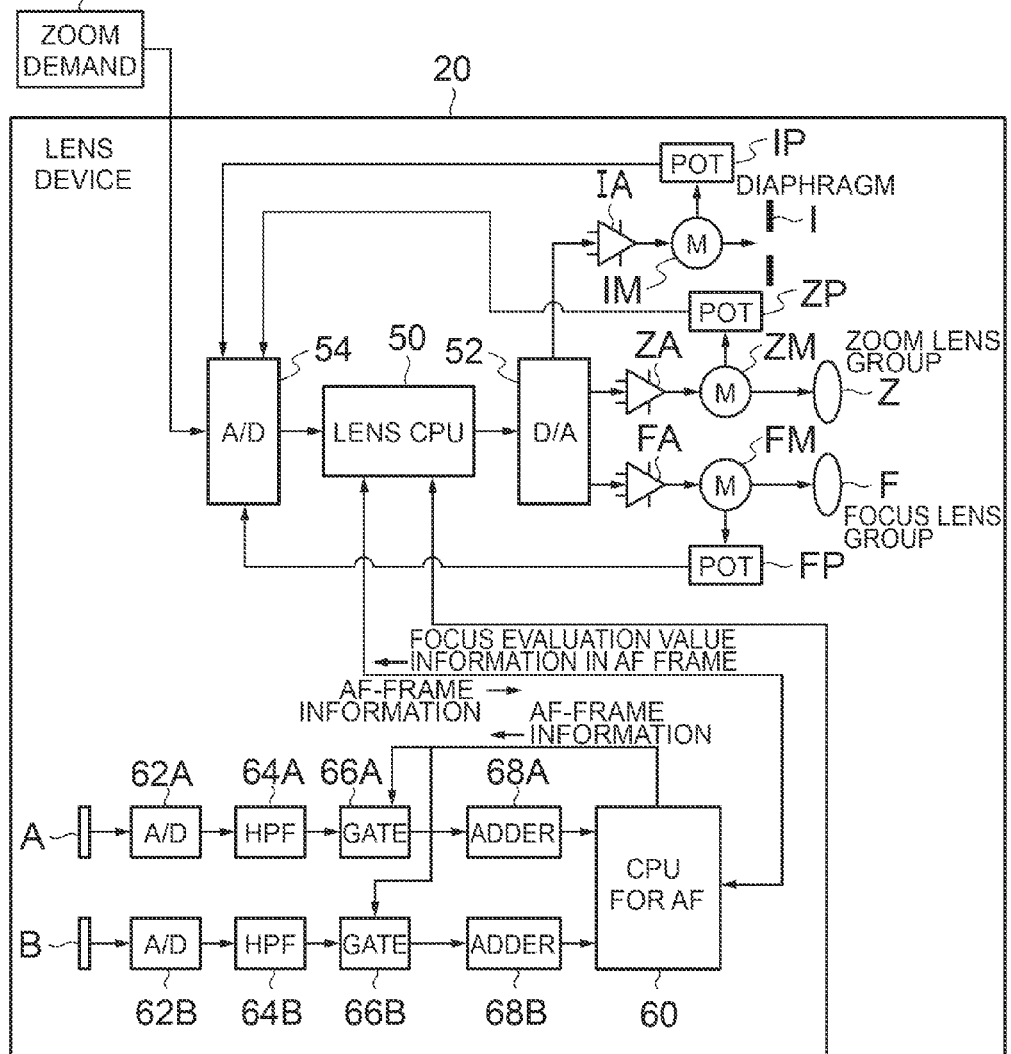
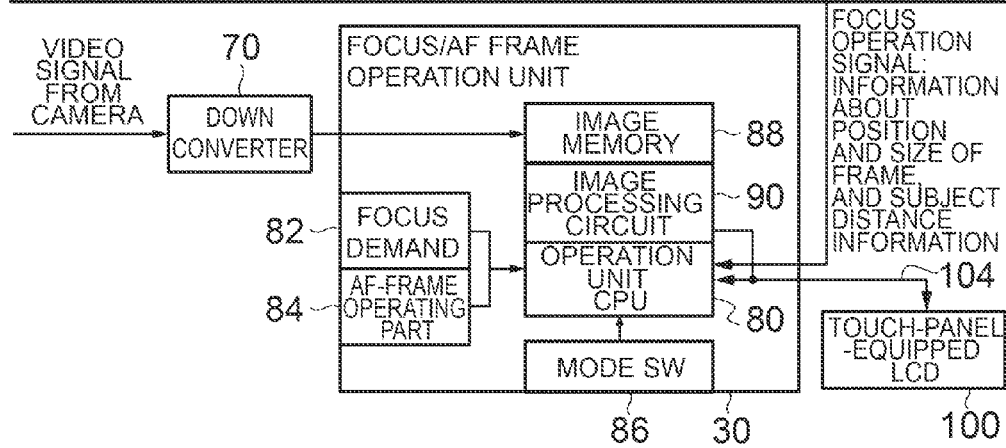

LENS DEVICE CAPABLE OF UTILIZING AN AF-FRAME AUTOMATIC TRACKING FUNCTION

CROSS-REFERENCE TO RELATED APPLICATIONS

This application is a PCT Bypass continuation application and claims the priority benefit under 35 U.S.C. §120 of PCT Application No. PCT/JP2012/052075 filed on Jan. 31, 2012 which application designates the U.S., and also claims the priority benefit under 35 U.S.C. §119 of Japanese Patent Application No. 2011-023932 filed on Feb. 7, 2011, which applications are all hereby incorporated in their entireties by reference.

BACKGROUND OF THE INVENTION

1. Field of the Invention

The presently disclosed subject matter relates to lens devices and, in particular, to a lens device in which a position and size of an AF area (an AF frame) is changeable, which is a target range for auto-focusing.

2. Description of the Related Art

As an autofocus (AF) adopted in a video camera such as a broadcasting video camera, a contrast-type AF has been known. In the contrast-type AF, a subject image formed by a taking lens is obtained by an image pickup element, and the focus of the taking lens is controlled so that the contrast of the subject image is maximum.

Also, in the contrast-type AF, the entire imaging screen (imaging range) is not taken as an AF target range. In general, a rectangular part of an AF area of the imaging screen is taken as an AF target range. A technology has been conventionally known in which the position and size of the AF area on the imaging screen can be changed and a desired subject in the imaging range is brought into focus by AF (for example, refer to Japanese Patent Application Laid-Open No. 10-173980).

Meanwhile, in an imaging system such as a television camera, a lens device including a taking lens is attachable to and removable from as camera (a camera head). Generally, in such imaging system, information required for displaying various information on a view finder is collected by the camera, and a video signal is generated in a circuit in the camera by superposing various information on the imaged video and outputted to the view finder. In such imaging system, when a lens device capable of changing the position and size of an AF area (an AF frame) and a camera are mounted as described above, an imaging system is constructed as follows, for example.

A main circuit for performing AF processing is mounted on the lens device, and a signal of a subject image required for contrast-type AF (a video signal for AF) is given from the camera to the lens device. Also, an operation unit for an operator to make an instruction for the position and size of the AF frame is connected to the lens device, and the operation by the operator is accepted with this operation unit. And AF-frame information indicating the position and size of the AF frame based on the accepted operation is sent from the operation unit via the lens device to the camera. The camera accepting the AF-frame information from the lens device superposes the AF frame on the imaged video for display on the view finder.

However, while some existing cameras have a function of displaying the AF frame on the view finder, some existing camera do not have the function. While even some cameras without the function of displaying the AF frame have a function of fixedly displaying a rectangular frame similar to the AF frame at a center part of a screen of a view finder, the frame does not match the actual AF frame.

Thus, it can be thought that the camera configuring the imaging system may not have an AF-frame display function. In this case, even hen the operator operates the operation unit to change the position or size of the AF frame, the operator cannot check the AF frame on the view finder. Moreover, once the position or size of the AF frame set in advance is changed, it is also difficult to estimate at which position and which size the AF frame is set on the imaging screen.

To solve these problems, in an auto-focus system described Japanese Patent Application Laid-Open No. 2005-345605, it is determined whether a camera where a lens device capable of changing the position and size of the AF frame is mounted has the AF-frame display function. Then, when the lens device is mounted on a camera without the AF-frame display function, the AF frame is fixed at a position and size set in advance.

Furthermore, an AF area operation device described in Japanese Patent Application Laid-Open No. 2006-195342 obtains a video signal of imaged video being imaged by a camera, generates video by superposing an AF frame indicating a range of an AF area on the imaged video, and outputs a video signal of the video obtained by superposition to a view finder of the camera. With this, even if a camera without the AF-frame display function is used, the AF frame is displayed so as to be able to be recognized by the operator.

SUMMARY OF THE INVENTION

In the invention described in Japanese Patent Application Laid-Open No. 2005-345605, when the lens device without the AF-frame display function is mounted on a camera, the AF frame is fixed at the position and size set in advance. Thus, even the AF frame is not displayed, the AF area to be brought into focus by AF (normally, a predetermined range at the center of the screen) can be advantageously taken as a range assumed by the operator. However, for example, if even as lens device with an AF-frame automatic tracking function of tracking a specific subject and bringing the subject into focus is mounted on a camera without the AF-frame display function, the AF-frame automatic tracking function cannot disadvantageously be used.

On the other hand, in the invention described in Japanese Patent Application Laid-Open No. 2006-195342, a video signal is generated by superposing the AF frame on an AF-area operating device side, and the video signal obtained by superposition is outputted to the camera. Thus, the structure of the camera has to be disadvantageously changed so that the video signal generated on the AF-area operating device side can be inputted and video can be displayed on the view finder of the camera based on the video signal.

The presently disclosed subject matter was made in view of these circumstances, and has an object of providing a lens device capable of utilizing an AF-frame automatic tracking function irrespectively of whether a camera where the lens device is mounted has an AF-frame display function and preventing an inconvenience of changing an AF frame with manual operation when the camera does not have the AF-frame display function.

To achieve the objects described above, the presently disclosed subject matter according to a first aspect of the presently disclosed subject matter provides a lens device to be mounted on a first camera including a view finder with an AF-frame display function or a second camera including a view finder without the AF-frame display function, the lens device includes an autofocus unit configured to control a focus of an imaging optical system so that, based on a video signal inputted from the camera, a subject in an AF frame set in an imaging area by the camera is brought into focus, a mode setting unit capable of setting a manual operation mode of manually setting the AF frame or an automatic tracking mode of automatically setting the AF frame, a subject detecting unit configured to detect a tracking target subject in the imaging range imaged by the camera when the automatic tracking mode is set by the mode setting unit, an AF-frame automatic tracking unit configured to set a predetermined range including the tracking target subject detected by the subject detecting unit as an AF frame for focusing by the autofocus unit, a camera information obtaining unit configured to obtain camera information indicating whether the camera having the lens device mounted thereon is the first camera or the second camera, and an AF-frame fixing/fixing-cancelling unit configured to changeably set a position and size of the AF frame when the camera information indicating the first camera is obtained by the camera information obtaining unit and when the camera information indicating the second camera and the automatic tracking mode is set, the AF-frame fixing/fixing-cancelling unit configured to fix the AF frame at a predetermined position and size when the camera information indicating the second camera is obtained and the automatic tracking mode is not set.

According to the lens device of one aspect of the presently disclosed subject matter, even when the lens device is mounted on the second camera including the view finder without the AF-frame display function, when the automatic tracking mode is set, the fixing of the AF frame is cancelled, and by the AF-frame automatic tracking unit, the position and size of the AF frame can be automatically changed according to the movement of a desired subject (for example, the human face). With this, a moving subject can be always brought into focus. While the AF frame is not displayed on the view finder of the camera (the operator cannot recognize the position and size of the AF frame) in this case, this poses no problem because AF is performed by automatically tracking the subject.

The lens device of another mode of the presently disclosed subject matter includes an AF-frame manual setting unit configured to set, by an operator, at least one of the position and size of the AF frame indicating a subject area in the imaging range for focusing by the autofocus unit, wherein the AF-frame fixing/fixing-cancelling unit is configured to enable the AF-frame manual setting unit when the camera information indicating the first camera is obtained by the camera information obtaining unit and fix the AF frame at the predetermined position and size when the camera information indicating the second camera is obtained and the manual operation mode is set.

When the lens device of the mode described above is mounted on the first camera, the AF frame is displayed on the view finder of the first camera (the operator can recognize the position and size of the AF frame). Thus, even if the operator manually changes the position or size of the AF frame, this poses no problem. On the other hand, when the lens device is mounted on the second camera, the AF frame is not displayed on the view finder of the second camera, and therefore, if the operator manually changes the position or size of the AF frame, the subject area (AF frame) being brought into focus by AF becomes unclear. Thus, the AF frame is fixed at the predetermined position and size to prevent the occurrence of the inconvenience described above.

In a lens device according to still another aspect of the presently disclosed subject matter, the first camera is a camera which makes a request of the lens device for AF-frame information indicating a range of a subject currently being brought into focus by the autofocus unit and, when accepting the AF-frame information from the lens device, superposes the AF frame on the imaged image currently hung imaged and causes a resultant image to be displayed on the vim finder, and the lens device includes an AF-frame information output unit configured to output the AF-frame information to the camera having the lens device mounted thereon.

In a lens device according to still another aspect of the presently disclosed subject matter, the camera information obtaining unit is configured to make a determination that the camera is the first camera when the request for the AF-frame information is accepted from the mounted camera, the camera information obtaining unit is configured to make a determination that the camera is the second camera when the request for the AF-frame information is not accepted, and the camera information obtaining unit obtains results of these determinations as the camera information. With this, the lens device can automatically obtain the camera information.

A lens device according to still another aspect of the presently disclosed subject matter includes a monitor device attachable to and removable from the lens device, the monitor device configured to superpose the AF frame on the image imaged by the camera based on the video signal outputted from the camera and the AF-frame information outputted from the AF-frame information output unit; a determining unit configured to determine whether the monitor device is mounted on the lens device; and an AF-frame manual setting unit configured to set, by an operator, at least one of the position and size of the AF frame indicating a subject area in the imaging range for focusing by the autofocus unit, wherein when it is determined by the determining unit that the monitor device is mounted, the AF-frame fixing/fixing-cancelling unit is configured to changeably set the position and size of the AF frame even when the lens device obtains the camera information indicating the second camera and the automatic tracking mode is not set.

According to the invention of the aspect described above, when the monitor device capable of displaying the AF frame is mounted separately, fixing of the AF frame is cancelled irrespectively of whether the camera mounted on the lens device has the AF-frame display function. This is because the position and size of the AF frame can be checked on the monitor device even when the AF frame is changed with manual operation.

In a lens device according to still another aspect of the presently disclosed subject matter, the determining unit is configured to include it least one of a first detecting unit configured to detect an electrical connection between the monitor device and the lens device and a second detecting unit configured to detect that the monitor device is mounted on the lens device, and the determination unit determines whether the monitor device is mounted on the lens device based on a detection output of at least one of the first detecting unit and the second detecting unit. With this, the lens device can automatically determine whether the monitor device is mounted.

In a lens device according to still another aspect of the presently disclosed subject matter, the AF-frame manual setting unit is a touch panel provided on a screen of the monitor device.

According to the presently disclosed subject matter, in principle, fixing or fixing-cancelling of the AF frame is performed according to whether the camera on which the lens device is mounted has the AF-frame display function, and this can prevent an inconvenience occurring by changing the AF frame with manual operation when the lens device is mounted on a camera without the AF-frame display function. On the other hand, even when the lens device is mounted on a camera without the AF-frame display function, fixing of the AF frame is cancelled when the automatic tracking mode is set, and AF-frame automatic tracking with the automatic tracking mode can be performed (the position and the size of the AF frame can be automatically changed). Therefore, the AF-frame automatic tracking function can be effectively utilized.

BRIEF DESCRIPTION OF THE DRAWINGS

FIG. 3 is a block diagram depicting a control system and an operation unit of the lens device according to an embodiment of the presently disclosed subject matter;

FIG. 11 is a block diagram of a modification example of FIG. 3.

DETAILED DESCRIPTION OF THE EMBODIMENTS

Embodiments of the presently disclosed subject matter are described in detail below according to the attached drawings.

[Entire Structure of Television Lens System Including Lens Device]

Figure 1:
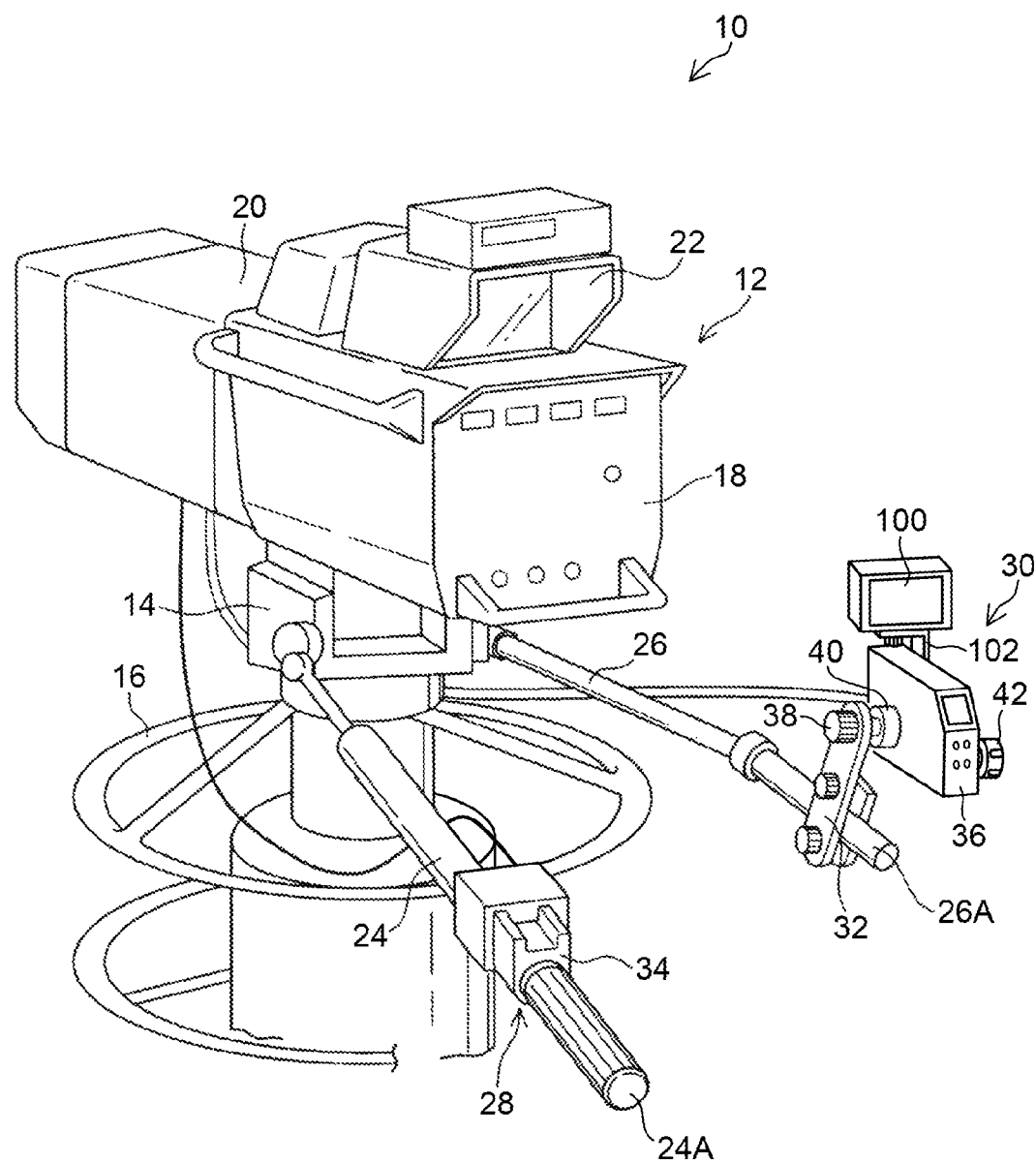
FIG. 1 is an external view of an entire structure of a television lens system including a lens device according to an embodiment of the presently disclosed subject matter.

FIG. 1 is an external view of an entire structure of a television lens system including a lens device according to an embodiment of the presently disclosed subject matter.

As depicted in FIG. 1, this television camera system is a television camera system 10 for broadcasting, including a television camera 12, a pan head 14 for panning/tilting operation on the television camera 12, and a pedestal dolly 16 where the pan head 14 is installed.

The television camera 12 includes a camera body 18 formed of an HD (High Definition) camera supporting a high-vision television scheme and a lens device 20 mounted on a lens mount of the camera body 18.

The camera body 18 has an image pickup element (for example, CCD (Charge Coupled Device)), a necessary signal processing circuit, and others incorporated therein. An image formed by the lens device 20 is subjected to optical/electrical conversion by the image pickup device and is then subjected to necessary processing by the signal processing circuit, and is outputted to the outside from a video signal output terminal of the camera body 18 as a video signal of an HDTV (High Definition Television) scheme (an HDTV signal).

A view finder 22 is installed on an upper portion of the camera body 18. On this view finder 22, video imaged by the television camera 12 is displayed.

The pan head 14 is provided with two operation bars 24 and 26 at left and right. The operation bars 24 and 26 have their tip provided with grip parts 24A and 26A, respectively. An operator (a cameraman) grasps these grip parts 24A and 26A to operate the pan head 14.

Also, the grip part 24A of the operation bar 24 on the left side has a zoom demand (a zoom controller) 28 mourned thereon, and the grip part 26A of the operation bar 26 on the right side has a focus/AF-frame operation unit 30 including a focus demand having a focus knob 42 mounted thereon with a mounting cramp 32.

The zoom demand 28 is provided with a thumb ring 34 for operating zooming of the lens device 20 so as to be rotatable about the axis of the grip part 24A. When this thumb ring 34 is operated by rotation, a zoom control signal for making an instruction for zoom (zoom lens) movement is given from the zoom demand 28 to the lens device 20, with a zoom speed according to the rotation position being taken as a target speed. With this, a zoom lens group of the lens device 20 moves at the target speed instructed with the zoom control signal.

The operation unit 30 includes a body 36 formed in a box shape. With his body 36 screwed to the mounting cramp 32 with a fixing screw 38, the operation unit 30 is mounted on the operation bar 26. The body 36 has one side face where a mount part 40 for screwing the body 36 to the mounting cramp 32 is formed. With the fixing screw 38 screwed into a screw hole formed on the mount part 40, the body 36 is mounted on the mounting cramp 32.

Figure 2:
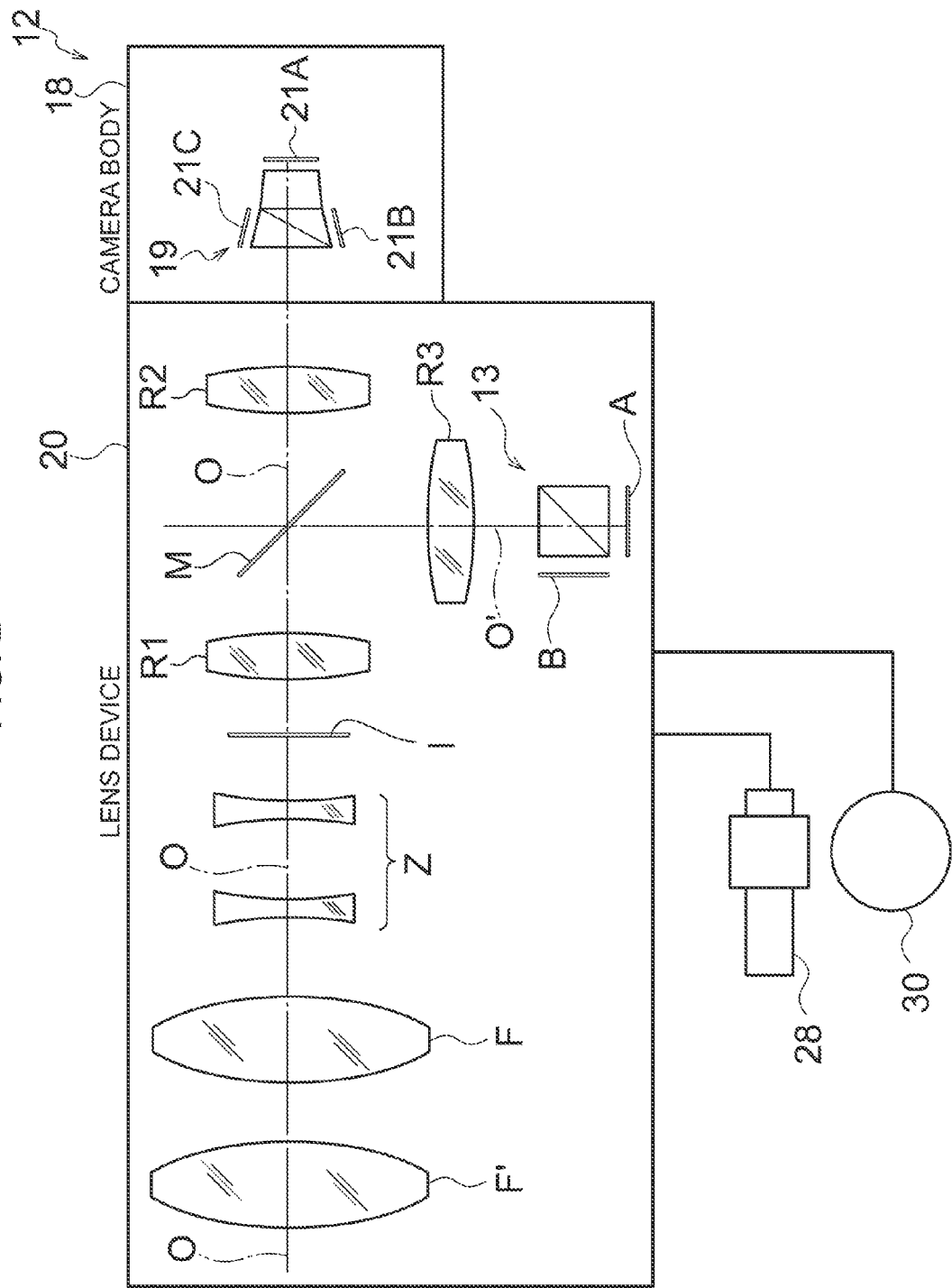
FIG. 2 is a structural diagram of an imaging optical system and others of the television camera system described above.

FIG. 2 is a structural diagram of an imaging optical system and others of the television camera system 10 described above. The television camera system in the drawing includes the television camera 12 configured of the lens device 20 having a taking lens (an optical system) and the camera body 18 on which the lens device 20 is removably mounted, the zoom demand 28 electrically connected to the lens device 20 via a communication cable, and the e operation unit 30.

The lens device 20 is configured of the taking lens (optical system) for forming a subject image, various lenses configuring an imaging optical system, and a control system for aperture control. The camera body 18 includes an imaging part 19 which converts the subject image formed by the optical system of the lens device 20 to an electrical signal, a signal processing part which performs a predetermined process on a signal outputted from the imaging part 19 to generate a video signal of a predetermined scheme for recording/reproduction, and others.

The optical system of the lens device 20 is configured of an optical system for video for forming a subject image for video (recording/reproduction) on the imaging part 19 of the camera body 18 and an optical system for AF for forming a subject image for autofocus (AF), which will be described in detail below.

The optical system for video includes, as depicted in the lens device 20, from a front surface side (a subject side) a fixing focus lens F, a movable focus lens F, a zoom lens Z formed of a variable power system and a correction system, an iris I, a front-side relay lens R1 configuring a relay lens (a relay optical system) a half mirror M, and a back-side relay lens R2. Note that the structure of each lens in the drawing is simplified, and a lens group formed of a plurality of lenses is depicted as one lens.

Subject light entering from the front surface side of the optical system for video passes through the optical system for video to be emitted from a back surface side, and the subject light enters the imaging part 19 of the camera body 18. The subject light entering the imaging part 19 of the camera body 18 is separated into, for example, three colors, that is red light, green light, and blue light, by a color separation optical system, and these lights enter imaging faces of image pickup elements 21A, 21B, and 21C (for example, CCD) for respective colors. With this, color video for recording/reproduction is imaged by the imaging part 19.

On the other hand, the half mirror M tilted at substantially 45 degrees with respect to an optical axis O of the optical system for video is placed between the front-side relay lens R1 and the back-side relay lens R2 of the relay optical system, and with this half mirror M, the subject light for AF for forming a subject image for AF from subject light for video guided to the imaging part 19 of the camera body 18 is branched, and the subject light for AF is guided to the optical system for AF with an optical is O' substantially orthogonal to the optical axis O of the optical system for video.

The optical system for AF includes a relay lens R3 having properties similar to those of the back-side relay lens R2 of the optical system for video and an imaging part for AF 13. Subject light for AF guided to the optical system for AF passes through the relay lens R3 to be formed on imaging faces of image pickup elements A and B (for example, CCD) of the imaging part for AF 13. Although not described in detail, the imaging part 13 is configured of two prisms (a light division optical system) and two image pickup elements A and B. The subject light for AF entering the light division optical system is divided into two subject lights with an equal light amount, and with each subject light obtained by division, a subject image (a subject image for AF) is formed on an imaging face of each of the image pickup elements A and B, with the subject brought into focus in a distance substantially equivalent to the image pickup element 21 for video (21A, 21B, and 21C). Note that the image pickup elements A and B are referred to as image pickup elements for AF, A and B, in order to be distinguished from the image pickup element 21 for video (21A, 21B, and 21C). Also, the image pickup elements for AF, A and B, do not necessarily image a color video, and image a monochrome video (obtain a luminance signal of the subject image).

FIG. 3 is a block diagram depicting the structure of the control system and the operation unit 30 of the lens device 20 described above.

In the drawing, the focus lens F, the zoom lens Z, and the iris configuring the optical system of the lens device 20 are depicted, and these are driven by motors FM, ZM, and IM. As a component of the control system of the lens device 20, the lens device 20 includes a lens CPU (Central Processing Unit) 50 controlling the entirety in a centralized manner. From the lens CPU 50 to each of amplifiers FA, ZA, and IA of the motors FM, ZM, and IM, a drive signal is given via a D/A converter 52, each of the motors FM, ZM, and IM is driven at a speed corresponding to the voltage of the drive signal. Therefore, the focus lens F, the zoom lens Z, and the iris I can be controlled by the lens CPU 50 each at a desired operation speed.

Also, position signals indicating rotation positions of the motors FM, ZM, and IM are outputted from potentiometers FP, ZP, and IP, respectively, and are given to the lens CPU 50 via an A/D converter 54. With this, the lens CPU 50 can read the positions of the focus lens F, the zoom lens Z, and the iris I. Therefore, the lens CPU 50 controls the operation speeds of the focus lens F, the zoom lens Z, and the iris I while reading the positions of the focus lens F, the zoom lens Z, and the iris I, thereby being able to perform control so that the focus lens F, the zoom lens Z, and the iris I are at desired positions.

For example, regarding the focus lens F, the control at the lens CPU 50 is performed according to an instruction signal given from the operation unit 30, which will be described in detail further below, or AF processing. Regarding the zoom lens Z, the control is performed according to an instruction signal given from the zoom demand 28 via the A/D converter 54 based on an operation of an operation member manually operated by the operator. Regarding the iris I the control is performed according to at instruction signal (not illustrated) given from the camera body 18.

The control of the focus lens F (focus control) is described, control modes for focus control include an AF mode for focus control with AF described above and an MF mode for focus control with manual focus (MF). Also, the AF mode includes an automatic tracking mode of automatically tracking a specific tracking target (for example, the human face or a subject instructed by the operator) and always bringing the tracking target into focus and a manual operation mode of manually setting the position and size of the AF frame by the operator. These modes can be selected as appropriate with a mode switch 86 provided on the operation unit 30.

Here, the operation unit 30 is formed by combining a conventional controller called a focus demand including an operation member (a focus ring) for focus manual operation and others and an AF-frame control device for AF-frame control, which will be described further below, and a block depicted as a focus demand 82 in the operation unit 30 of FIG. 3 represents such a conventional focus demand.

Figure 4:
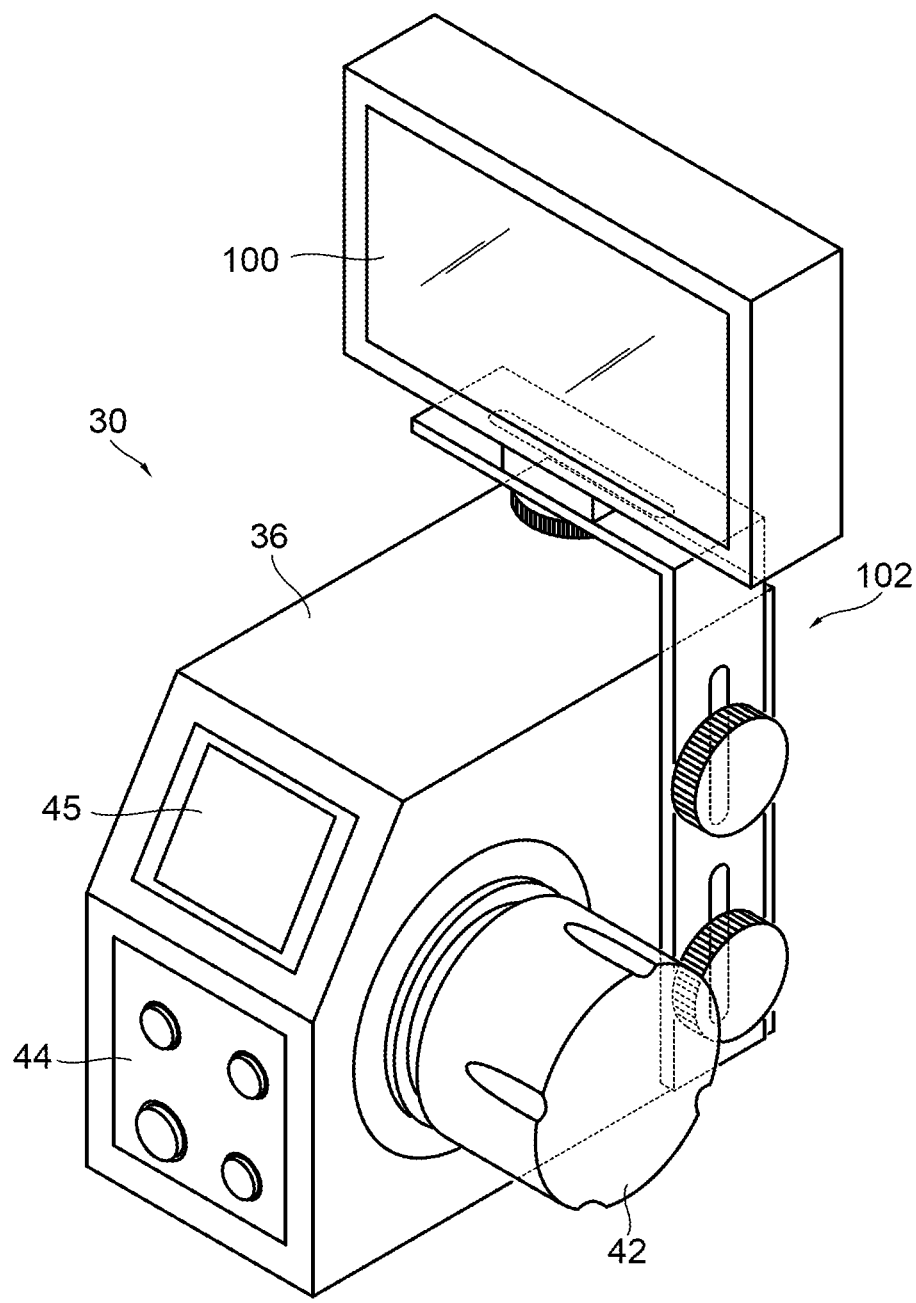
FIG. 4 is a perspective view of an outer appearance of an operation unit.

FIG. 4 is a perspective view of an outer appearance of the operation unit 30.

On a side surface on another side of the body 36 of the operation unit 30, the focus knob 42 for manually operating the focus of the lens device 20 is provided. This focus knob 42 is provided so as to be rotatable about the center axis, and has to shaft mounted so as to be orthogonal to the lateral surface of the body 36. When this focus knob 42 is operated for rotation at the time of the MF mode, a focus control signal is given from the focus demand 82 via the operation unit CPU 80 to the lens device 20, the focus control signal for making an instruction for movement of the focus (the focus lens F) with a focus position according to the rotation position being taken as a target position. With this, the focus lens of the lens device 20 moves to the target position instructed by the focus control signal.

Also, on a front surface of the body 36 of the operation unit 30, an operation panel 44 and the liquid-crystal panel 45 are provided. The operation panel 44 is provided with various operation members for performing operation regarding AF control details and MF control, such as a mode switch for switching between an AF mode and an MF mode and switching the type of AF mode (the automatic tracking mode and the manual operation mode) and an AF start switch for making an instruction for staring AF. On the liquid-crystal display panel 45, information about focus-control setting conditions and others are displayed. Then inside the body 36 of the operation unit 30 is provided with a processing circuit which detects a setting state of each of the various operation members and sends a control signal based on the detected setting state.

On a back surface of the body 36 of the operation unit 30, a connector not illustrated is provided for electrical connection to the lens device 20. With connecting to the lens device 20 via this connector over a communication cable, the operation unit 30 can transmit and receive various signals to and from the lens CPU 50 of the lens device 20. With this, various control signals can be sent from the operation unit 30 to the lens device 20, and on the lens device 20 side, processes according to the control signals can be performed by the lens CPU 50.

Also, the body 36 of the operation unit 30 has incorporated therein the operation unit CPU 80, the image memory 88, and an image processing circuit 90 (refer to FIG. 3) for specifying the AF frame (position, size, and shape (aspect ratio), with manual operation, which will be described further below, or the AF-frame automatic tracking process.

On a back surface of the body 36 of the operation unit 30, a video input connector not illustrated for capturing a video signal into the operation unit CPU 80 is provided. The operation unit 30 is connected via this video input connector to the camera body 18 with a communication cable. With this, the video signal outputted from the camera body 18 can be captured into the operation unit 30.

[Touch-Panel-Equipped LCD]

On the operation unit 30, a touch-panel-equipped liquid-crystal display (LCD) 100 can be mounted as an operating unit for performing operation regarding AF-frame control, and is mounted on the body 36 with a bracket 102 in the present embodiment.

This touch-panel-equipped LCD 100 allows settings of the automatic tracking mode, the manual operation mode, or the like regarding AF-frame setting to be inputted with a touch operation. With the operation unit CPU 80, an image displayed on a screen thereof can be switched as appropriate according to the details of settings.

On the back surface of the body 36 of the operation unit 30, a connector not illustrated is provided for electrical connection with this touch-panel-equipped LED 100. Connected to the touch-panel-equipped LCD 100 via the connector and the communication cable, the operation unit 30 can transmit and receive various signals to and from the touch-panel-equipped LCD 100.

Referring back to FIG. 3, when a signal indicating that the MF mode has been selected is received from the operation unit CPU 80, the lens CPU 50 performs a process for focus control by MF (MF processing). That is, based on the rotation position of the focus knob 42 of the operation unit 30 (the focus demand 82), the position of the focus lens F is controlled so as to be a position instructed by the instruction signal given from the operation unit CPU 80 (a target position).

[AF Control]

When a signal indicating that the AF mode has been selected is received from the operation unit CPU 80, the lens CPU 50 performs a process for focus control by AF (AF processing) for automatic focus adjustment, and performs a focus adjustment, automatically.

In the description about AF, according to the present embodiment, AF can be performed with an optical path length difference scheme (a contrast scheme).

Figure 5:
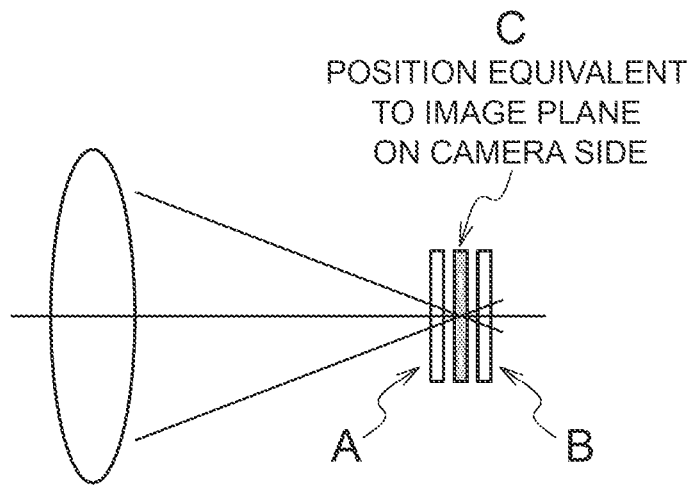
FIG. 5 is a diagram depicting an arrangement of an AF imaging element.

In this AF, AF of the optical path length difference scheme using the image pickup elements for AF, A and B, of the optical system for AF depicted in FIG. 2 and FIG. 3 is adopted. As depicted in FIG. 5, when optical axes of the image pickup elements for AF, A and B, are depicted on a same straight line, the image pickup elements for AF, A and B, have different optical path lengths until the subject light enters the imaging face of each of the image pickup elements for AF, A and B, and the imaging faces of the image pickup elements for AF, A and B are placed at positions with an equal distance at front and back with respect to a position C, which serves as an optical path length matching with the imaging surfaces of the image pickup element 21 (21A, 21B, and 21C) of the camera body 18.

Figure 6:
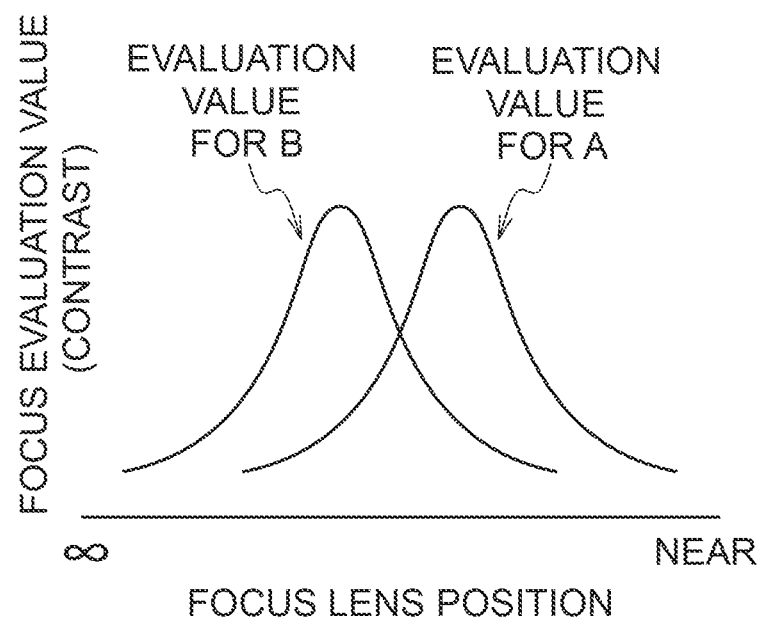
FIG. 6 is a diagram depicting a relation between a focus position and a focus evaluation value (contrast) obtained from the AF imaging element.

Here, if a subject without a state change is imaged while the position of the focus lens F (focus position) is changed from an infinite distance side to a near side, contrasts (focus evaluation values) of images imaged by each of the image pickup elements for AF, A and B, are changed as depicted in FIG. 6.

Although details are omitted, when the focus evaluation values of the images imaged by the image pickup elements for AF, A and B are compared With each other, if these focus evaluation values match each other, it can be determined that the focus state with respect to the image pickup element for video 21 of the optical system for video is an in-focus state. That is, the contrast of the image imaged by the image pickup element for video 21 becomes maximum.

On the other hand, it can be determined that the state is a frontal focus state if the focus evaluation value of the image pickup element for AF, A, is larger and the state is a back focus state if the focus evaluation value of the image pickup element for AF, B, is larger.

In the AF mode, the lens CPU 50 obtains the focus evaluation values of the images imaged by the image pickup elements for AF, A and B from a CPU fur AF 60 to detect a focus state, moves the focus lens F based on the focus state, and sets the focus lens F at a position in the in-focus state.

In FIG. 3, video signals (luminance signals) of video imaged by the image pickup elements for AF, A and B (video for AF) pass A/D converters 62A and 62B, high-pass filters (HPFs) 64A and 64B, gate circuits 66A and 66B, and adder circuits 68A and 68B, respectively. Then, focus evaluation values are found in units of video frames (in units of video screens) and read into the CPU for AF 60.

That is, the video signals of the video for AF imaged by the image pickup elements for AF, A and B, are first converted by the A/D converters 62A and 62B to digital signals, and only high-frequency components are extracted by the HPFs 64A and 64B, respectively. Then, of the video signals of high-frequency components, video signals in an AF frame (in an AF area), which will be described further below, indicating a range (a AF target range) of as target subject to be brought into focus by AF are extracted by the gate circuits 66A and 66B. The values of the video signals in the AF frame are added together by the adder circuits 68A and 68B to find a focus evaluation value.

Note that the range of the AF frame from which the video signals are extracted by the gate circuits 66A and 66B is set by the CPU for AF 60. The CPU for AF 60 sets the range of the AF frame based on AF-frame information given from the operation unit 30 via the lens CPU 50.

[AF-Frame Control]

Figure 8:
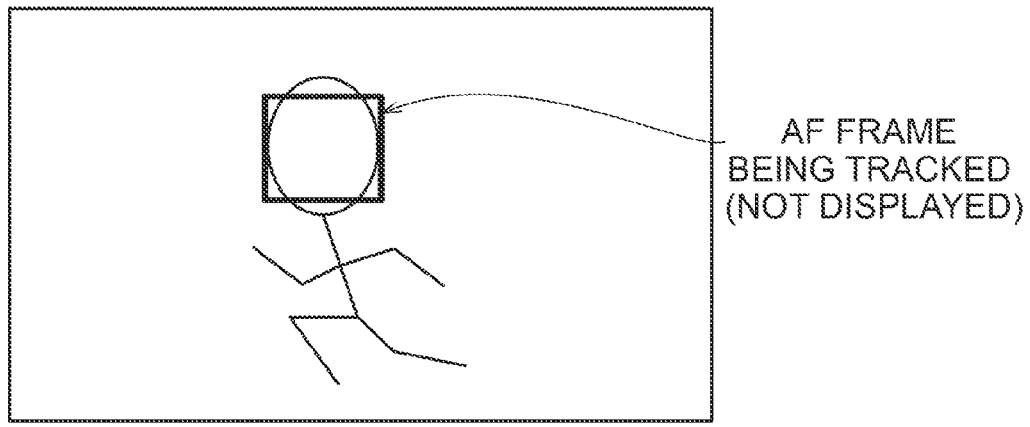
FIG. 8 is a diagram depicting a mode of allowing an AF frame to be changed without displaying the AF frame at the time of an AF-frame automatic tracking mode.
Figure 9:
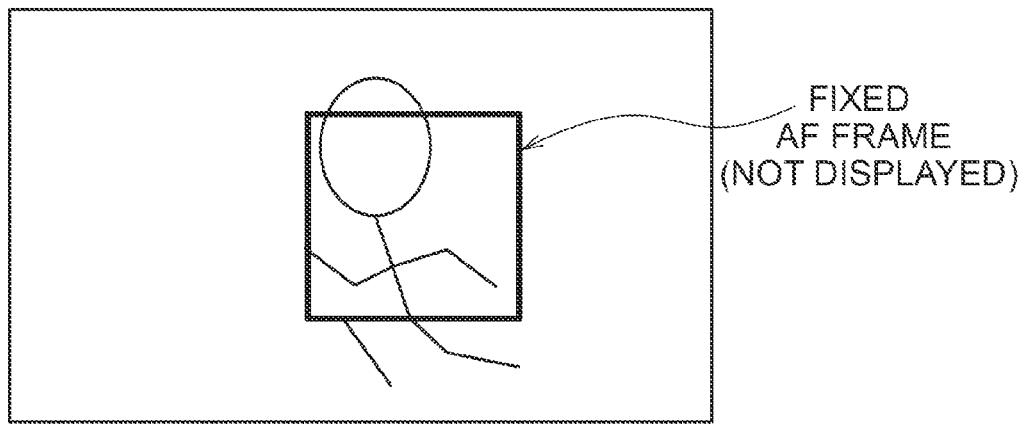
FIG. 9 is a diagram depicting a mode of fixing an AF frame without changing the AF frame at the time of an AF-frame manual operation mode.

Next, AF-frame control is described. As depicted in FIG. 8 and FIG. 9, the AF frame is set as an outline of a rectangular area (an AF area) with respect to an imaging range image by the image pickup element for video 21, and at the time of the AF mode, a subject in the range of the AF frame can be brought into focus.

In FIG. 3, an AF frame control device for AF-frame control is incorporated in the operation unit 30 as described above, and the operation unit CPU 80 for control the entirety in a centralized manner is included. The operation unit CPU 80 decides the range of the AF frame having a position, size, and shape (aspect ratio) being taken as elements, transmits AF-frame information indicating the range of the AF frame to the lens CPU 50 via serial communication. With this, as described above, the range of the AF frame is given from the lens CPU 50 to the CPU for AF 60 and the range of the video signal extracted at the gate circuits 66A and 66B is set as a range of the AF frame given from the operation unit CPU 80 of the operation unit 30.

On the other hand, as described above as AF-frame control, it is possible to select, as appropriate by the mode switch 86, the manual operation mode for setting the AF frame at a desired position in the imaging range with manual operation by the operator and the automatic tracking mode of automatically changing the AF frame range to the position (range) of a subject as a predetermine tracking target.

In the manual operation mode, the operation unit CPU 80 determines the range of the AF frame according to the manual operation of an operation member included in the AF-frame operating part 84 of FIG. 3. In FIG. 4 the operation panel 44 and the liquid-crystal display panel 45 provided to the body 36 of the operation unit 30 function as manual operating members. As the manual operation members, a joystick, a trackball, a knob, any of buttons others can be manual operation members for setting the position, size, and shape of the AF frame with manual operation by the operator. Also, when the touch-panel-equipped LCD 100 is mounted on the operation unit 30, that touch panel can be a manual operation member for setting the position, size, and others of the AF frame.

The operation unit CPU 80 decides the position, size, and others of the AF frame based on the setting state of the manual operation members. Note that the AF-frame information indicating the position, size, and others of the AF frame currently set is given from the lens device 20 to the camera according to a request from the camera with the AF-frame display function, and is displayed in a superposed manner on the imaged vide on the view finder 22 installed in the camera body.

On the other hand, in the automatic tracking mode, the range of the subject of the tracking target is detected based on the video imaged by the image pickup element 21 of the camera body 18, and the operation unit CPU 80 decides that range as the range of the AF frame. Note that as with the manual operation mode, when an operation member for manually operating the position, size, and others of the AF frame is operated in the automatic tracking mode, that operation is prioritized, and the position size, and others of the AF frame are set. With this, the subject at the time of start of automatic tracking can be specified.

A video signal obtained by imaging by the image pickup element for video 21 of the camera body 18 and outputted from the camera body 18 is down-converted by a down-converter 70 so as to have an appropriate resolution, and is then inputted to the operation unit 30. Then, images in units of frames are sequentially stored in an image memory 88 of the operation unit 30.

The image processing circuit 90 performs a pattern matching process to detect a range matching a reference pattern registered in advance from among images stored in the image memory 88. In the present embodiment, a subject image in an initial range of the AF frame at the time of setting the automatic tracking mode is set as the reference pattern, and the subject is set as a tracking target. Note that in the case of automatic tracing of the face of a specific person, a human face area is detected in images stored in the image memory 88, and that face area can be taken as a tracking target.

The operation unit CPU 80 takes a range where the reference pattern has been detected by the image processing circuit 90 as a subject range of the tracking target, and decides the range as a range of the AF frame. By sequentially repeating this process, the AF range is changed so as to tack the subject as the tracking target.

[First Embodiment]

Next, win AF-frame setting process at the lens device according to a first embodiment is described.

Figure 7:
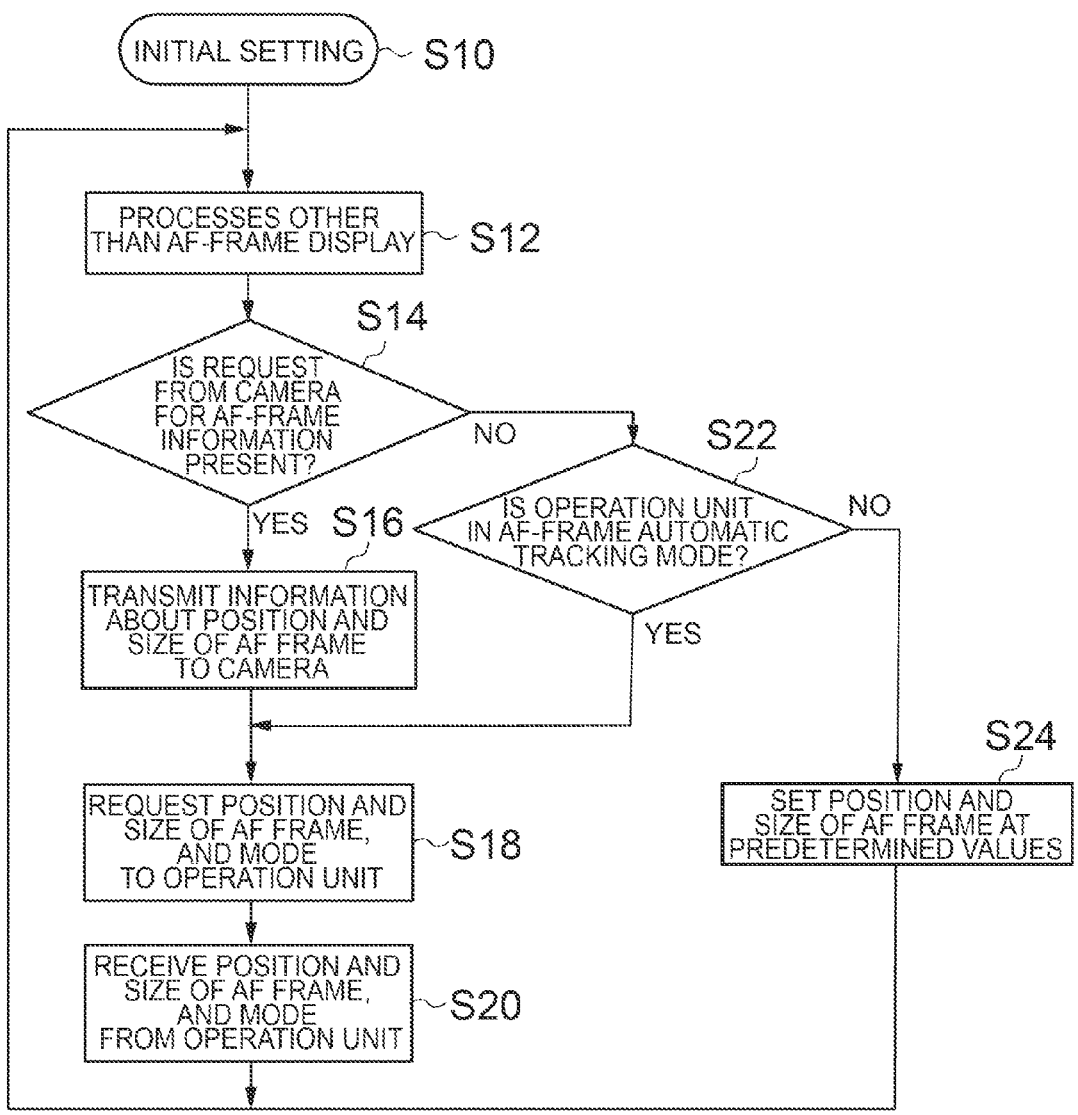
FIG. 7 is a flowchart depicting an AF-frame setting process at the lens device according to a first embodiment.

FIG. 7 is a flowchart depicting the AF-frame setting process at the lens device according to the first embodiment.

In FIG. 7 the lens CPU 50 of the lens device 20 first perform initial settings including setting of a focus control mode, according to mode information inputted from the operation unit 30 and others (step S10). Subsequently, the lens CPU 50 performs processes other than AF-frame display (for example, focus control based on the AF frame currently set, zoom control based on a zoom control signal from the zoom demand 28, or control of the iris I based on an instruction signal given from the camera body 18) (step S12).

Next, it is determined whether a request for AF-frame information from the camera body 18 where the lens device 20 is mounted is present (step S14). As described above, when the camera body 18 has the AF-frame display function, a request is made to the lens device 20 for AF-frame information required to superpose the AF frame on the video in the view finder on a camera side. On the other hand, when the camera body 18 does not have the AF-frame display function, a request is not made to the lens device 20 for AF-frame information. Note that the camera body 18 and the lens device 20 transmit and receive various information through serial communications via a serial communication interface (SCI) provided to each.

Then, when a request for AF-frame information from the camera is present ("in the case of YES"), the lens CPU 50 determines that the device is mounted on a camera with the AF-frame display function, and transmits information about the position and size of the current AF frame (AF-frame information) via the SCI to the camera body 18 (step S16). With this, the camera body 18 can superpose and display the AF frame indicating the AF area where AF is currently being performed on video displayed on the view finder 22.

Subsequently, the lens CPU 50 requests the position, size, and mode of the AF frame from the operation unit 30 (step S18), and receives information about the position, size, and mode of the AF frame set on an operation unit 30 side (step S20). Then, this is reflected to AF, preparing for a request for obtaining AF-frame information from the camera next time.

On the other hand, when a request for AF-frame information from the camera is not present at step S14 ("in the case of NO"), the lens CPU 50 determines that the lens device is mounted on to camera without the AF-frame display function, and causes the procedure to make a transition to step S22.

At step S22, it is determined whether an AF-frame automatic tracking mode has been set by the operation unit 30. Then, when it is determined that the AF-frame control mode is an automatic tracking mode ("in the case of YES"), the procedure is caused to make a transition to step S18, obtaining AF-frame information from the operation unit 30 (steps S18 and S20). That is, the AF frame can be updated in the automatic tracking mode.

In the case described above, as depicted in FIG. 8, the AF-frame information is not transmitted to the camera body, and no AF frame is displayed on the view finder of the camera. In the automatic tracking mode, the subject is automatically tracked with the AF frame, thereby posing no problem in AF-frame operation even if the AF frame is not displayed.

On the other hand, when it is determined at step S22 that the AF-frame control mode is not an automatic tracking mode ("in the case of NO"), the procedure is caused to make a transition to step S24. At step S24, the lens CPU 50 sets the position and size of the AF frame at predetermined values of the position and size set in advance (fixes the AF frame). With this, the lens device 20 performs AF according to the fixed AF frame.

As depicted in FIG. 9, similarly to the above, the AF frame is not displayed on the view finder of the camera, but the AF frame is fixed at a predetermined position and size. Therefore, even if the position or size of the AF frame is changed in the manual operation mode, that change is not reflected in AF. With this, it is possible to avoid an inconvenience in which the lens device 20 performs AF according to the position and size of the AF frame not intended by the operator.

[Second Embodiment]

Next, an AF-frame setting process at the lens device according to a second embodiment is described.

Figure 10:
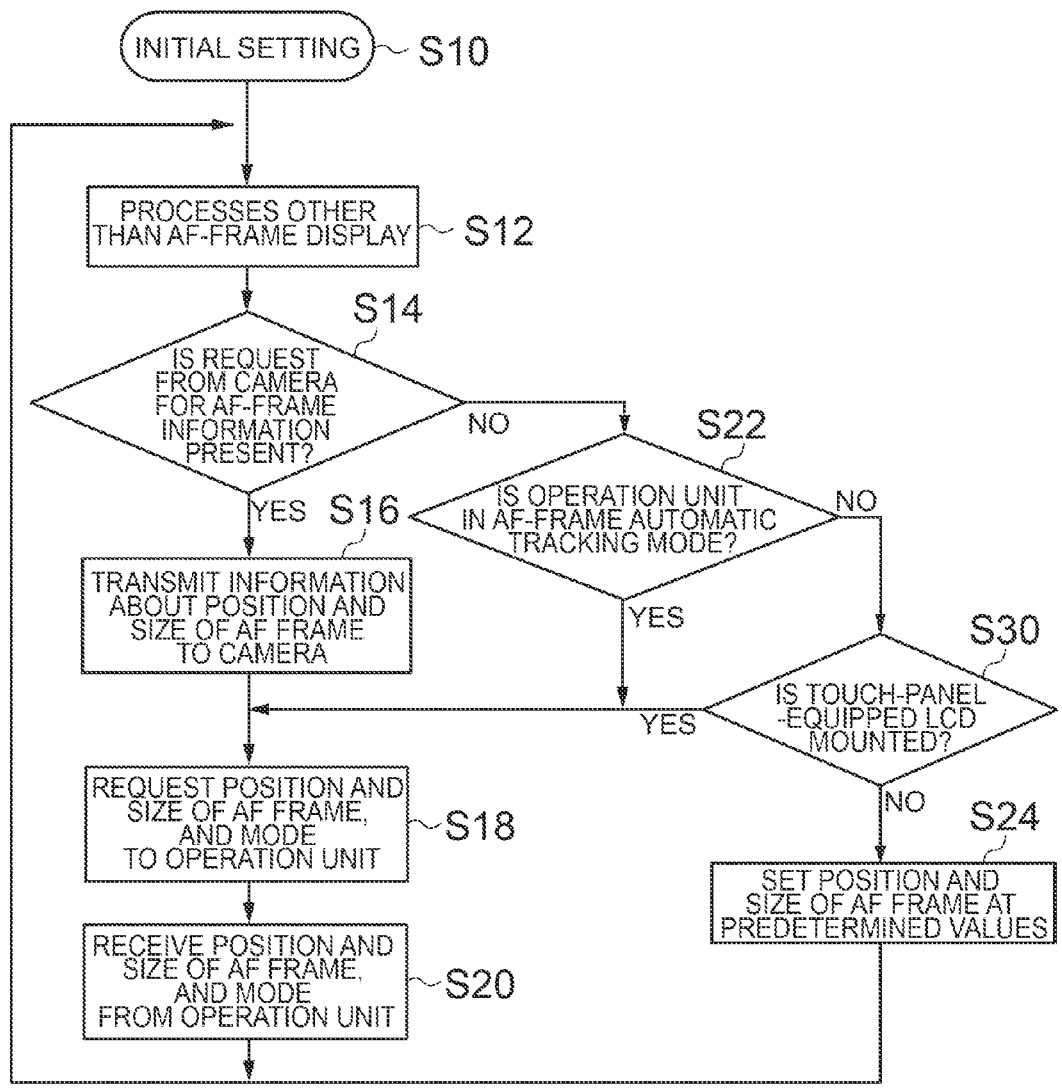
FIG. 10 is a flowchart depicting an AF-frame setting process at the lens device according to a second embodiment.

FIG. 10 is a flowchart depicting the AF-frame setting process at the lens device according to the second embodiment. Note that portions common to those in the flowchart of the first embodiment depicted in FIG. 7 are provided with the same step numbers and are not described in detail.

The second embodiment is different from the first embodiment in that a process of step S30 is added.

That is, when the AF-frame control mode is not an automatic tracking mode ("in the case of NO") in step S22, the procedure is caused to make a transition to step S30.

At step S30, it is determined whether the touch-panel-equipped LCD 100 is mounted on the operation unit 30.

When the touch-panel-equipped LCD 100 is mounted on the operation unit 30, as depicted in FIG. 11, the operation unit CPU 80 of the operation unit 30, the image processing circuit 90, and the touch-panel-equipped LCD 100 are electrically connected via a communication cable 104, and transmit and receive various signals including a video signal to and from each other.

That is, when a touch operation is performed on the touch-panel-equipped LCD 100, position information indicating the touched position (coordinates) is given to the operation unit CPU 80. With this, the position of the touch operation and the type of the operation (such as a tap operation or a double-tap operation) performed on the screen of the touch-panel-equipped LCD 100 is detected by the operation unit CPU 80. With this, an AF-frame control mode according to the operation can be selected, and the position, size, shape, and others of the AF frame in the manual operation mode can be set.

Also, by inputting a video signal having the AF frame superposed thereon via the image processing circuit 90, the touch-panel-equipped LED 100 can display the AF frame together with video being imaged by the camera body. Note that the touch-panel-equipped LED 100 may receive the video signal and the AF-frame information from the operation unit 30, and the touch-panel-equipped LCD 100 may perform an AF-frame superposing process.

Meanwhile, the operation unit CPU 80 determines whether the touch-panel-equipped LCD 100 is mounted, and the operation unit CPU 80 sends the determination result to the lens CPU 50. Here, the determination as to whether the touch-panel-equipped LCD 100 is mounted on the operation unit 30 can be made by using a detection output of a microswitch which detects a mechanical connection between the operation unit 30 and the touch-panel-equipped LCD 100 with the bracket 102, as depicted in FIG. 4. Also, in place of or in addition to the microswitch, the determination can be made by using a detection output of a detecting unit which detects the presence or absence of the connection of the communication cable 104 (FIG. 11) electrically connecting both.

When receiving, from the operation unit CPU 80, information indicating that the touch-panel-equipped LCD 100 is mounted ("in the case of YES" at step S30 of FIG. 10), the lens CPU 50 causes the procedure to make a transition to Step S18.

With this, even when the camera does not have the AF-frame display function and is not set in the automatic tracking mode, the lens CPU 50 obtains the AF-frame information from the operation unit 30 (steps S18 and S20), allowing the AF frame to he changed. For example, when the manual operation mode is selected, the position and size of the AF frame can be manually changed, and the lens device 20 can perform AF according to the AF frame after change. In this case, the AF frame is displayed on the touch-panel-equipped LCD 100. Thus, the operator can check the position and size of the AF frame on the touch-panel-equipped LCD, and there is no problem even if the camera does not have the AF-frame display function.

On the other hand, when receiving, from the operation unit CPU 80, information indicating that the touch-panel-equipped LCD 100 is not mounted ("in the case of NO" at step S30 of FIG. 10), the lens CPU 50 causes the procedure to make a transition to step S24.

With this, even if the position or size of the AF frame has been changed, the AF frame is fixed at the position and size set in advance, and an inconvenience can be avoided in which AF is performed according to the position and size of the AF frame not intended by the operator.

Note that in the first and second embodiments described above, the lens CPU 50 fixes/cancels the fixing of the AF frame based on the mode of transmission from the operation unit 30 to the lens CPU 50 of the lens device 20, the information indicating the presence or absence of mounting of the touch-panel-equipped LCD 100, and others. However, the presently disclosed subject matter is not restricted to this. For example, the operation unit CPU 80 on the operation unit side may fix/cancel the fixing of the AF frame. In this case, the operation unit CPU 80 is required to obtain information about the camera (information indicating whether the camera has the AF-frame display function) from the lens CPU 50.

Also, while the lens device 20 of the embodiments is a lens device in a strict sense not including the zoom demand 28, the operation unit 30, and the touch-panel-equipped LCD 100, these zoom demand 28 operation unit 30, and touch-panel-equipped LCD 100 are devices attached to the lens device 20, being electrically connected directly or indirectly to the lens device 20 to operate the lens device 20, and a lens device in a broad sense includes these zoom demand 28, operation unit 30, and touch-panel-equipped LCD 100. Also, the AF scheme is not restricted to the scheme of the present embodiments, various schemes can be applied, and the touch-panel-equipped LCD 100 may not include a touch panel.

Furthermore, the presently disclosed subject matter is not restricted to the embodiments described above, and it goes without saying that the presently disclosed subject matter can be variously modified within a range not deviating from the spirit of the presently disclosed subject matter.

What is claimed is:

1. A lens device to be mounted on a first camera including a view finder with an AF-frame display function or a second camera including a view finder without the AF-frame display function, the lens device comprising:
   an autofocus unit configured to control a focus of an imaging optical system so that, based on a video signal inputted from a camera mounted on the lens device, a subject in an AF frame set in an imaging area by the camera is brought into focus;
   a mode setting unit capable of setting a manual operation mode of manually setting the AF frame or an automatic tracking mode of automatically setting the AF frame;

a subject detecting unit configured to detect a tracking target subject in the imaging range imaged by the camera when the automatic tracking mode is set by the mode setting unit;

an AF-frame automatic tracking unit configured to set a predetermined range including the tracking target subject detected by the subject detecting unit as an AF frame for focusing by the autofocus unit;

a camera information obtaining unit configured to obtain camera information indicating whether the camera having the lens device mounted thereon is the first camera or the second camera; and an AF-frame fixing/fixing-cancelling unit configured to changeably set a position and size of the AF frame when the camera information indicating the first camera is obtained by the camera information obtaining unit and when the camera information indicating the second camera is obtained and the automatic tracking mode is set, the AF-frame fixing/fixing-cancelling unit configured to fix the AF frame at a predetermined position and size when the camera information indicating the second camera is obtained and the automatic tracking mode is not set.

2. The lens device according to claim 1, comprising an AF-frame manual setting unit configured to set, by an operator, at least one of the position and size of the AF frame indicating a subject area in the imaging range for focusing by the autofocus unit, wherein the AF-frame fixing/fixing-cancelling unit enables the AF-frame manual setting unit when the camera information indicating the first camera is obtained by the camera information obtaining unit, and fixes the AF frame at the predetermined position and size when the camera information indicating the second camera is obtained and the manual operation mode is set.

3. The lens device according to claim 2, wherein the first camera is a camera which makes a request of the lens device for AF-frame information indicating a range of a subject currently being brought into focus by the autofocus unit and, when accepting the AF-frame information from the lens device, superposes the AF frame on the imaged image currently being imaged and causes a resultant image to be displayed on the view finder, and the lens device comprises an AF-frame information output unit configured to output the AF-frame information to the camera having the lens device mounted thereon.

4. The lens device according to claim 3, wherein the camera information obtaining unit makes a determination that the camera is the first camera when the request for the AF-frame information is accepted from the mounted camera, the camera information obtaining unit makes a determination that the camera is the second camera when the request for the AF-frame information is not accepted, and the camera information obtaining unit obtains results of these determinations as the camera information.

5. The lens device according to claim 1, wherein the first camera is a camera which makes a request of the lens device for AF-frame information indicating a range of a subject currently being brought into focus by the auto unit and when accepting the AF-frame information from the lens device, superposes the AF frame on the imaged image currently being imaged and causes a resultant image to be displayed on the view finder, and the lens device comprises an AF-frame information output unit configured to output the AF-frame information to the camera having the lens device mounted thereon.

6. The lens device according to claim 5, wherein the camera information obtaining unit makes a determination that the camera is the first camera when the request for the AF-frame information is accepted from the mounted camera, the camera information obtaining unit makes a determination that the camera is the second camera when the request for the AF-frame information is not accepted, and the camera information obtaining unit obtains results of these determinations as the camera information.

7. The lens device according to claim 6, comprising:

a monitor device attachable to and removable from the lens device, the monitor device configured to superpose the AF frame on the image imaged by the camera based on the video signal outputted from the camera and the AF-frame information outputted from the AF-frame information output unit;

a determining unit configured to determine whether the monitor device is mounted on the lens device; and an AF-frame manual setting unit configured to set, by an operator, at least one of the position and size of the AF frame indicating a subject area in the imaging range for focusing by the autofocus unit, wherein when it is determined by the determining unit that the monitor device is mounted, the AF-frame fixing/fixing-cancelling unit changeably sets the position and size of the AF frame even when the lens device obtains the camera information indicating the second camera and the automatic tracking mode is not set.

8. The lens device according to claim 7, wherein the determining unit includes at least one of a first detecting unit configured to detect an electrical connection between the monitor device and the lens device and a second detecting unit configured to detect that the monitor device is mounted on the lens device, and the determining unit determines whether the monitor device is mounted on the lens device based on a detection output of at least one of the first detecting unit and the second detecting unit.

9. The lens device according to claim 5, comprising:

a monitor device attachable to and removable from the lens device, the monitor device configured to superpose the AF frame on the image imaged by the camera based on the video signal outputted from the camera and the AF-frame information outputted from the AF-frame information output unit;

a determining unit configured to determine whether the monitor device is mounted on the lens device; and an AF-frame manual setting unit configured to set, by an operator, at least one of the position and size of the AF frame indicating a subject area in the imaging range for focusing by the autofocus unit, wherein when it is determined by the determining unit that the monitor device is mounted, the AF-frame fixing/fixing-cancelling unit changeably sets the position and size of the AF frame even when the lens device obtains the camera information indicating the second camera and the automatic tracking mode is not set.

10. The lens device according to claim 9, wherein the determining unit includes at least one of a first detecting unit configured to detect an electrical connection between the monitor device and the lens device and a second detecting unit configured to detect that the monitor device is mounted on the lens device, and the determining unit determines whether the monitor device is mounted on the lens device based on a detection output of at least one of the first detecting unit and the second detecting unit.

11. The lens device according to claim 9,
wherein the AF-frame manual setting unit is a touch panel provided on a screen of the monitor device.

\* \* \* \* \*